United States Patent
Rieder (10) Patent No.: US 11,791,542 B2
(45) Date of Patent: Oct. 17, 2023

(54) RF DEVICES INCLUDING CONFORMAL ANTENNAS AND METHODS FOR MANUFACTURING THEREOF

(71) Applicant: Infineon Technologies AG, Neubiberg (DE)

(72) Inventor: Bernhard Rieder, Regensburg (DE)

(73) Assignee: Infineon Technologies AG, Neubiberg (DE)

( * ) Notice: Subject to any disclaimer, the term of this patent is extended or adjusted under 35 U.S.C. 154(b) by 402 days.

(21) Appl. No.: 16/853,995

(22) Filed: Apr. 21, 2020

(65) Prior Publication Data
US 2020/0343626 A1 Oct. 29, 2020

(30) Foreign Application Priority Data
Apr. 26, 2019 (DE) .......................... 102019110840.3

(51) Int. Cl.
| | |
|---|---|
| *H01Q 1/32* | (2006.01) |
| *H01Q 1/12* | (2006.01) |
| *G01S 13/931* | (2020.01) |
| *G01S 7/03* | (2006.01) |

(52) U.S. Cl.
CPC .......... *H01Q 1/3233* (2013.01); *G01S 7/032* (2013.01); *G01S 13/931* (2013.01); *H01Q 1/1271* (2013.01); *G01S 2013/93276* (2020.01)

(58) Field of Classification Search
CPC .... H01Q 1/3233; H01Q 1/1271; G01S 7/032; G01S 13/931; G01S 2013/93276
USPC ........................................................ 343/713
See application file for complete search history.

(56) References Cited

U.S. PATENT DOCUMENTS

| | | | | |
|---|---|---|---|---|
| 4,710,775 A | * | 12/1987 | Coe .......................... | H01Q 13/18 343/793 |
| 5,023,624 A | * | 6/1991 | Heckaman ......... | H01Q 21/0087 333/33 |
| 5,620,799 A | | 4/1997 | Sauer | |
| 5,914,690 A | * | 6/1999 | Lehtola ................ | H01Q 9/0407 343/702 |
| 5,955,752 A | * | 9/1999 | Fukaya .................... | H01Q 1/42 257/664 |
| 6,181,287 B1 | * | 1/2001 | Beigel ................ | G08B 13/2431 343/741 |

(Continued)

FOREIGN PATENT DOCUMENTS

| | | | | |
|---|---|---|---|---|
| DE | 10221989 A1 | * | 12/2003 | ........... H01Q 1/3283 |
| EP | 2522049 B1 | * | 3/2018 | ........... H01Q 1/2208 |

(Continued)

OTHER PUBLICATIONS

Kilian, A., et al., "Conformal Superstrate Loaded Automotive Radar Antenna for Integration in Polymer Car Body Panels," Proceedings of the Fourth European Conference on Antennas and Propagation, 2010, 5 pages.

*Primary Examiner* — Nuzhat Pervin
(74) *Attorney, Agent, or Firm* — Harrity & Harrity, LLP (57) ABSTRACT

A radio frequency (RF) device includes a conformal RF antenna configured to be mounted on a non-metallic component of a vehicle and configured to operate at frequencies greater than 10 GHz. The RF device further includes an RF chip mounted on the conformal RF antenna and electrically coupled to the conformal RF antenna to transfer an RF signal of a frequency greater than 10 GHz to the conformal RF antenna.

27 Claims, 8 Drawing Sheets

(56) References Cited

U.S. PATENT DOCUMENTS

| | | | | |
|---|---|---|---|---|
| 6,992,629 | B2* | 1/2006 | Kerner | H01Q 1/40 333/33 |
| 7,477,194 | B2* | 1/2009 | Coleman | H01L 23/49855 343/895 |
| 8,847,823 | B2* | 9/2014 | Vos | B32B 37/12 343/700 MS |
| 8,996,126 | B2* | 3/2015 | Stevenson | H03H 7/0123 607/63 |
| 9,142,485 | B2* | 9/2015 | Grasset | H01L 23/48 |
| 10,225,932 | B1* | 3/2019 | Simula | H01R 12/712 |
| 10,279,200 | B2* | 5/2019 | Hyde | A61B 5/1121 |
| 10,307,871 | B2* | 6/2019 | Coleman | F28D 9/00 |
| 10,322,566 | B2* | 6/2019 | Kamo | B32B 27/302 |
| 10,383,550 | B2* | 8/2019 | Hyde | A61B 5/1118 |
| 10,390,755 | B2* | 8/2019 | Goodall | A61N 5/0625 |
| 11,245,175 | B2* | 2/2022 | Jeong | H01L 23/645 |
| 2002/0122006 | A1* | 9/2002 | Crawford | H01Q 9/0407 343/702 |
| 2004/0140429 | A1* | 7/2004 | Jack | G01J 5/08 250/338.1 |
| 2005/0093677 | A1* | 5/2005 | Forster | H01Q 1/38 343/700 MS |
| 2005/0225481 | A1* | 10/2005 | Bonthron | H01Q 21/0093 342/175 |
| 2006/0011449 | A1* | 1/2006 | Knoll | G07D 7/01 194/214 |
| 2008/0036668 | A1* | 2/2008 | White | H01Q 1/38 343/873 |
| 2008/0089039 | A1* | 4/2008 | Gregory | B81C 1/00333 29/840 |
| 2009/0278690 | A1* | 11/2009 | Degani | G06K 19/07749 340/572.1 |
| 2010/0327068 | A1* | 12/2010 | Chen | G06K 19/07749 235/492 |
| 2011/0315774 | A1* | 12/2011 | Baba | G06K 19/07758 235/492 |
| 2013/0050046 | A1* | 2/2013 | Jarvis | H01Q 9/145 343/852 |
| 2013/0176176 | A1* | 7/2013 | Vos | H01Q 1/38 343/700 MS |
| 2013/0269175 | A1* | 10/2013 | Handy | H01Q 1/28 29/600 |
| 2014/0354462 | A1 | 12/2014 | Shi | |
| 2015/0249167 | A1* | 9/2015 | Zhang | H01B 13/30 252/512 |
| 2015/0346322 | A1* | 12/2015 | Schmalenberg | H01Q 13/206 342/175 |
| 2016/0093944 | A1* | 3/2016 | Kamo | H01Q 1/1271 348/148 |
| 2016/0211826 | A1* | 7/2016 | Abdolvand | H03H 9/02244 |
| 2017/0207514 | A1* | 7/2017 | Kamo | B32B 7/05 |
| 2017/0236776 | A1* | 8/2017 | Huynh | H01L 23/49822 438/26 |
| 2017/0324138 | A1* | 11/2017 | Talty | H01Q 1/1271 |
| 2018/0181853 | A1* | 6/2018 | Ennabli | H01Q 13/103 |
| 2018/0226727 | A1* | 8/2018 | Sato | H01Q 21/28 |
| 2019/0103653 | A1* | 4/2019 | Jeong | H01Q 1/2283 |
| 2019/0178983 | A1* | 6/2019 | Lin | G01S 7/4021 |
| 2019/0192000 | A1* | 6/2019 | Heikenfeld | B05D 3/007 |
| 2019/0371621 | A1* | 12/2019 | Darmawikarta | H01L 23/49822 |
| 2019/0393613 | A1* | 12/2019 | Kakuya | H01Q 9/045 |
| 2020/0006846 | A1* | 1/2020 | Lasiter | H01Q 21/08 |
| 2020/0052390 | A1* | 2/2020 | Ahmadloo | H01Q 21/065 |
| 2020/0091608 | A1* | 3/2020 | Alpman | H01Q 21/24 |
| 2020/0280120 | A1* | 9/2020 | Niakan | H01Q 21/28 |
| 2020/0313287 | A1* | 10/2020 | Kona | H01Q 21/08 |
| 2020/0313288 | A1* | 10/2020 | Kona | G01S 13/931 |
| 2021/0050650 | A1* | 2/2021 | Chiu | H01L 23/3675 |
| 2022/0091224 | A1* | 3/2022 | Kovermann | G01S 7/0235 |

FOREIGN PATENT DOCUMENTS

| | | | | |
|---|---|---|---|---|
| KR | 20180096695 A | * | 12/2016 | G01S 5/02 |
| WO | WO-2015042576 A1 | * | 3/2015 | H04B 1/0007 |
| WO | WO-2016187589 A1 | * | 11/2016 | G06K 19/0724 |
| WO | WO-2017106709 A1 | * | 6/2017 | G01S 11/02 |
| WO | WO-2017112525 A1 | * | 6/2017 | H01Q 1/3275 |

* cited by examiner

RF DEVICES INCLUDING CONFORMAL ANTENNAS AND METHODS FOR MANUFACTURING THEREOF

RELATED APPLICATION

This application claims priority to German Application No. 102019110840.3 filed Apr. 26, 2019, which is incorporated herein by reference in its entirety.

FIELD

The present disclosure generally relates to radio frequency (RF) technology. More particular, the present disclosure relates to RF devices including conformal antennas and methods for manufacturing such RF devices.

BACKGROUND

RF devices may e.g. be used for safety applications. For example, automotive radar sensors may be used for blind spot detection, automated cruise control, collision avoidance systems, etc. In this regard, the radar sensors may be typically mounted behind a bumper of the vehicle. Manufacturers of RF devices are constantly striving to improve their products. In particular, it may be desirable to shrink the size of RF sensor systems while maintaining or even increasing a performance and reliability of the systems.

SUMMARY

An aspect of the present disclosure relates to an RF device. The RF device comprises a conformal RF antenna configured to be mounted on a non-metallic component of a vehicle and configured to operate at frequencies higher than 10 GHz. The RF device further comprises an RF chip mounted on the conformal RF antenna and electrically coupled to the conformal RF antenna to transfer an RF signal of a frequency higher than 10 GHz to the conformal RF antenna.

An aspect of the present disclosure relates to a method. The method comprises mounting an RF chip on a conformal RF antenna. The method further comprises mounting the conformal RF antenna on a non-metallic component of a vehicle.

An aspect of the present disclosure relates to a system. The system comprises a non-metallic component of a vehicle. The system further comprises an RF chip mounted on the non-metallic component by an adhesion promoter.

BRIEF DESCRIPTION OF THE DRAWINGS

The accompanying drawings are included to provide a further understanding of aspects and are incorporated in and constitute a part of this specification. The drawings illustrate aspects and together with the description serve to explain principles of aspects. Other aspects and many of the intended advantages of aspects will be readily appreciated as they become better understood by reference to the following detailed description. The elements of the drawings are not necessarily to scale relative to each other. Like reference signs may designate corresponding similar parts.

DETAILED DESCRIPTION

In the following detailed description, reference is made to the accompanying drawings, in which are shown by way of illustration specific aspects in which the disclosure may be practiced. In this regard, directional terminology, such as "top", "bottom", "front", "back", etc. may be used with reference to the orientation of the figures being described. Since components of described devices may be positioned in a number of different orientations, the directional terminology may be used for purposes of illustration and is in no way limiting. Other aspects may be utilized and structural or logical changes may be made without departing from the concept of the present disclosure. Hence, the following detailed description is not to be taken in a limiting sense, and the concept of the present disclosure is defined by the appended claims.

Figure 1:
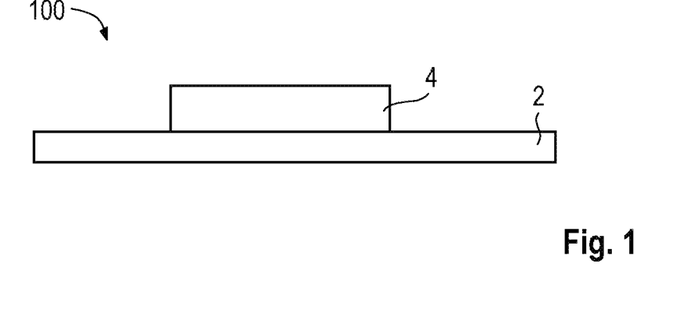
FIG. 1 schematically illustrates a cross-sectional side view of an RF device 100 in accordance with the disclosure.

FIG. 1 schematically illustrates a cross-sectional side view of a radio frequency (RF) device 100 in accordance with the disclosure. The RF device 100 is illustrated in a general manner in order to qualitatively specify aspects of the disclosure. The RF device 100 may include further aspects which are not illustrated for the sake of simplicity.

For example, the RF device 100 may be extended by any of the aspects described in connection with other RF devices and methods in accordance with the disclosure.

The RF device 100 includes a conformal RF antenna 2. The conformal RF antenna 2 is configured to be mounted on (or to be attached to) a non-metallic component of a vehicle (not shown). In addition, the conformal RF antenna 2 is configured to operate at frequencies higher than 10 GHz. The RF device 100 further includes an RF chip 4 mounted on (or attached to) the conformal RF antenna 2. In the example of FIG. 1, the RF chip 4 is illustrated to be in direct contact with a surface of the conformal RF antenna 2. In this regard, it is understood that one or multiple additional components or layers, such as e.g. an adhesive layer, may be arranged between the RF chip 4 and the conformal RF antenna 2 as will become apparent from examples described below. The RF chip 4 is electrically coupled to the conformal RF antenna 2 to transfer an RF signal of a frequency higher than 10 GHz to the conformal RF antenna 2.

The conformal RF antenna 2 and high frequency circuits of the RF chip 4 may operate in a frequency range of greater than about 10 GHz. More particular, the conformal RF antenna 2 and the RF chip 4 may operate in a high frequency range or microwave frequency range, which may range from about 10 GHz to about 300 GHz. Microwave circuits may include, for example, microwave transmitters, microwave receivers, microwave transceivers, microwave sensors, microwave detectors, etc. RF devices in accordance with the disclosure may e.g. be used for radar applications where the frequency of the RF signals may be modulated. Accordingly, the conformal RF antenna 2 may particularly correspond to a conformal radar antenna, and the RF chip 4 may particularly correspond to a radar chip. Radar microwave devices may be used, for example, in automotive or industrial applications for range finding/range measuring systems. By way of example, automatic vehicle cruise control systems or vehicle anti-collision systems may operate in the microwave frequency range, for example in the 24 GHz, 77 GHz, or 79 GHz frequency bands. The RF chip 4 may be made of or may comprise a semiconductor elemental material (e.g., example Si, etc.) or a compound semiconductor material (e.g., GaN, SiC, SiGe, GaAs, etc.).

The conformal RF antenna 2 may be configured to conform or follow a prescribed shape, such as e.g. a flat curving antenna mounted on or embedded in a curved surface. Accordingly, the material or the components of the conformal RF antenna 2 may be flexible to a certain degree in order to allow the conformal RF antenna 2 to follow a curved mounting surface. For example, conformal RF antennas may be a form of patch array antenna, more particular phased array antenna. They may be formed by an array of multiple, in particular identical, small flat antenna elements covering the surface. For example, the antenna elements may be patch antennas (or patches). At each antenna, a current from a transmitter may pass through one or multiple phase shifters which may be controlled by a microprocessor. By controlling the phase of the feed current, non-directional millimeter waves (mm-waves) emitted by the individual antennas may be made to interfere in front of the antenna, thereby forming one or multiple beam(s) of mm-waves which may point in a desired direction. Controlling the phase may therefore allow beamforming of the emitted mm-waves by directing the main lobe in a predetermined direction. For example, this may be used to address a mounting of the antenna in non-optimal direction. In a receiving antenna, individual mm-wave signals received by each antenna element may be combined in the correct phase in order to enhance signals received from a particular direction. This way, the antenna may be made sensitive to a particular direction and may reject or attenuate interfering signals from other directions. In one example, the individual antenna elements of a conformal phased array antenna may be mounted on a flat surface. In a further example of a conformal phased array antenna, the antenna elements may be mounted on a curved surface, wherein the phase shifters may be configured to compensate for different phase shifts caused by varying path lengths of RF waves due to the location of the individual antennas on the curved surface. Note that more detailed examples of conformal RF antennas are shown and described in connection with FIGS. 17 and 18.

The electrical coupling between the RF chip 4 and the conformal RF antenna 2 may be non-galvanic (wireless). That is, a transfer of RF signals between the RF chip 4 and the conformal RF antenna 2 may not be realized by an electrical conductor, such as e.g. a coaxial cable. Thus, a connection of the RF chip 4 and the conformal RF antenna 2 by an electrical conductor can be avoided. In one example, a transfer of RF signals may be realized by means of capacitive coupling. The RF chip 4 may thus include a coupling structure configured to couple an RF signal provided by the RF chip 4 into the conformal RF antenna 2 and vice versa. Such coupling structure may e.g. include one or multiple patch antennas. Alternatively or additionally, a transfer of RF signals between the RF chip 4 and the conformal RF antenna 2 may be established via one or multiple waveguides.

The conformal RF antenna 2 may be mounted on a non-metallic component of a vehicle. The vehicle may be a motor vehicle, such as e.g. a car, a truck, a bus, a motorcycle, etc. The non-metallic component may be any non-metallic part of the vehicle providing a surface suitable for mounting the conformal RF antenna 2. The non-metallic component may include or may be made of at least one of a glass material, a plastic material, a ceramic material, etc. For example, the non-metallic component may include at least one of a window, a lighting cover, a mirror casing, etc. The window may be a rear window, a side window, or a windshield of the vehicle. The lighting cover may be arranged at the backside, at the frontside, or at a side surface of the vehicle. The mirror casing may be arranged inside or outside of the vehicle. In one specific example, the mirror casing may be arranged on an inner surface of a windshield of the vehicle, i.e. within the passenger compartment.

Figure 2:
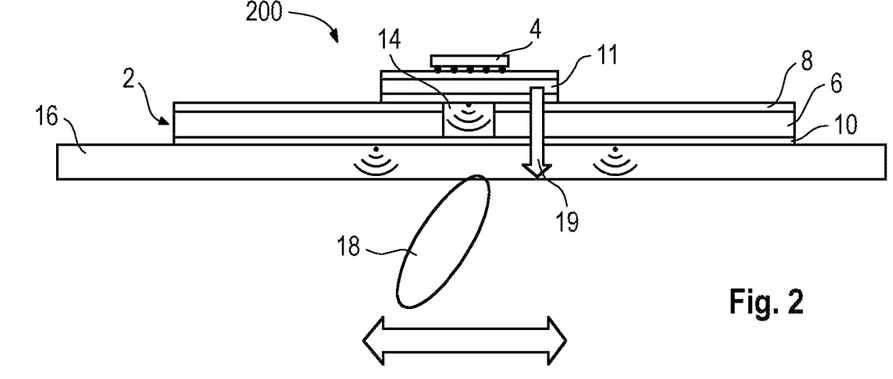
FIG. 2 schematically illustrates a cross-sectional side view of an RF device 200 in accordance with the disclosure mounted on a non-metallic component of a vehicle.

FIG. 2 schematically illustrates a cross-sectional side view of an RF device 200 in accordance with the disclosure mounted on a non-metallic component 16 of a vehicle (not shown). For example, the RF device 200 may be seen as a more detailed implementation of the RF device 100 of FIG. 1.

The RF device 200 may include a conformal RF antenna 2. The conformal RF antenna 2 may include a flexible dielectric substrate 6, a ground layer 8 arranged over the upper surface of the dielectric substrate 6, and an antenna layer 10 arranged over the bottom surface of the dielectric substrate 6. The RF device 200 may further include a ball grid array (BGA) laminate 11 arranged over the conformal RF antenna 2 and an RF chip 4 arranged over the BGA laminate 11.

For example, the RF chip 4 may be mounted on the BGA laminate 11 by a flip chip mounting technique. That is, the conformal RF antenna 2 may be used as a mounting element for the RF chip 4. When viewed in a direction perpendicular to e.g. the mounting surface of the conformal RF antenna 2, the BGA laminate 11 and/or the RF chip 4 may at least partly overlap with the conformal RF antenna 2. The dielectric substrate 6 may include a cavity 14, wherein the BGA laminate 11 and the RF chip 4 may be at least partly arranged over the cavity 14. The RF device 200 may be mounted on (or may be attached to) a non-metallic component 16 of a vehicle, such as e.g. a windshield of a car. That is, the non-metallic component 16 may be used as a mounting element for the conformal RF antenna 2. The RF device 200 may be electrically connected to a power supply (not shown) and a data connection (not shown). The data connection may be configured to provide a data exchange between the RF device 200 and e.g. a central processor of the vehicle.

The dielectric substrate 6 may be made of or may include at least one of an FR-4 material, a PTFE material, a low loss dielectric material, a ceramic material, etc. The ground layer 8 and the antenna layer 10 may be made of or may include a suitable metal or metal alloy, such as e.g. copper. In one specific example, the conformal RF antenna 2 may be formed by a copper-clad PTFE material. The dielectric substrate 6, the ground layer 8 and the antenna layer 10 may be flexible such that the conformal RF antenna 2 may be mounted on a curved surface. Note that a more detailed example of a ground layer is e.g. shown and described in connection with FIG. 7. Note further that more detailed examples of antenna layers are e.g. shown and described in connection with FIGS. 9, 17 and 18.

In the example of FIG. 2, the RF chip 4 may be a flip chip mounted on a BGA laminate 11. In a further example, the RF chip 4 may be a bare die mounted on the conformal RF antenna 2. In yet a further example, the RF device 200 may include a housing, wherein the RF chip 4 may be at least partly encapsulated in the housing. The housing may include at least one of a laminate, a circuit board, a semiconductor package, a wafer level semiconductor package, a panel level semiconductor package, etc. The conformal RF antenna 2 may be arranged, in particular completely, external to or outside of the housing. Due to such external arrangement of the conformal RF antenna 2, the size of the RF device 200 may not depend on the size of the conformal RF antenna 2. Rather, the size of the RF device 200 may specifically depend on the size of the RF chip, a footprint of which may e.g. have a value in a range from about 0.25 cm2 (square centimeter) to about 2 cm2 (square centimeter). That is, the size of an RF device in accordance with the disclosure may be smaller compared to RF devices including a housing with an RF antenna at least partly arranged inside of the housing.

During an operation, the RF device 200 may transmit and receive RF signals. In particular, the RF device 200 may transmit radar signals and receive echoed signals from possible targets. Multiple echoes over time may be collected, stored and analyzed. In this connection, the RF device 200 may include an integrated circuit (not shown) configured to process transmit signals and/or receive signals. In addition, data may be exchanged between the RF device 200 and a central processor of the vehicle (not shown) via a data connection (not shown).

A high frequency circuit of the RF chip 4 may be configured to generate RF signals which may be coupled into the BGA laminate 11. The RF signals may be routed from the upper surface of the BGA laminate 11 to the lower surface of the BGA laminate 11, for example via one or multiple conductors and/or via one or multiple waveguide structures formed in the BGA laminate 11. The RF signals routed through the BGA laminate 11 may be coupled into the antenna layer 10 of the conformal RF antenna 2 via a coupling structure (not shown), such as e.g. a patch antenna, which may be arranged on the lower surface of the BGA laminate 11. In particular, such coupling structure may be arranged in the cavity 14 of the dielectric substrate 6 such that a propagation of the radar radiation may not be attenuated by the material of the dielectric substrate 6. The antenna layer 10 may radiate the RF signals through the non-metallic component 16. RF signals received by the RF device 200 at the antenna layer 10 may be forwarded to the RF chip 4 in a similar fashion.

The non-metallic component 16 may be free of materials or structures that may block or absorb radar radiation. For example, a windshield of a vehicle may include one or multiple metallic layers for reducing a heat exposure inside of the vehicle. Since such metallic layers may at least partly absorb radar radiation, the windshield may be cleared from such absorbing layers. Radiating elements of the antenna layer 16 may be arranged over sections of the windshield which are free of such metallic layers. In general, the conformal RF antenna 2 may be arranged behind optically uncritical parts of the windshield, such as e.g. a non-attenuating layer, e.g. made of a ceramic material, which may, for example, be arranged close to the inside rearview mirror.

The radiation pattern and/or the antenna characteristic of the conformal RF antenna 2 may include a main lobe 18. The mounting surface of the non-metallic component 16 may be non-perpendicular to a main detection direction of the RF device 200. Accordingly, the main lobe 18 may be chosen to be non-perpendicular to a plane defined by the antenna layer 10. In one example, the direction of the main lobe 18 may be fixed. In a further example, the direction of the main lobe 18 may be adjustable which is indicated by a horizontal bidirectional arrow in FIG. 2. An adjustable main lobe direction may e.g. be provided when the conformal RF antenna 2 includes a phased array antenna. In particular, the RF chip 4 may be configured to drive the phased array antenna to adjust the main lobe 18 of the conformal RF antenna 2, for example the shape and the direction of the main lobe 18. Note that an example of a phased array antenna is described in connection with FIG. 18.

The conformal RF antenna 2 may be configured to provide a thermal path 19 for dissipating thermal energy generated by the RF chip 4 in a direction towards the non-metallic component 16 which is indicated by a perpendicular arrow in FIG. 2. That is, the conformal RF antenna 2 and/or the non-metallic component 16 of the vehicle may be used as a heatsink. In this connection, a thermal conductivity of the dielectric substrate 6 may have a value in a range from about 0.1 W/mK to about 0.3 W/mK. In one specific example, the value of the thermal conductivity may be about 0.2 W/mK. In addition, a thermal resistance of the dielectric substrate 6 may have a value in a range from about 2.5 K/W to about 5 K/W.

Figure 3:
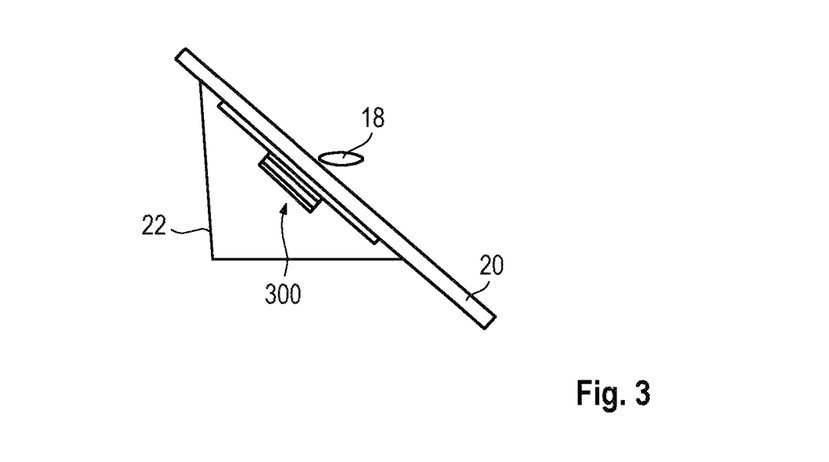
FIG. 3 schematically illustrates a cross-sectional side view of a system including an RF device 300 in accordance with the disclosure mounted on a windshield of a vehicle.

FIG. 3 schematically illustrates a cross-sectional side view of a system including an RF device 300 in accordance with the disclosure mounted on a windshield 20 of a vehicle (not shown). For example, the RF device 300 may be similar to the RF device 200 of FIG. 2. The RF device 300 may be mounted on the inner surface of the windshield 20, i.e. inside the vehicle. For example, the RF device 300 may be glued or laminated to the windshield 20. In the example of FIG. 3, the RF device 300 may be arranged inside of or may be integrated into a casing 22 which may be attached to the windshield 20. For example, the casing 22 may be a part of the interior rear view mirror or may be a separate casing arranged adjacent to the interior rear view mirror. The casing 22 may house further components which are not illustrated for the sake of simplicity. For example, the casing 22 may contain one or multiple camera module(s), one or multiple rain sensor(s), etc. The RF device 300 may share a power supply with these further electronic components. During an operation of the RF device 300, a main lobe 18 may point in a moving direction of the vehicle. In the example of FIG. 3, the main lobe 18 may point in a direction substantially parallel to the road surface.

Figure 4:
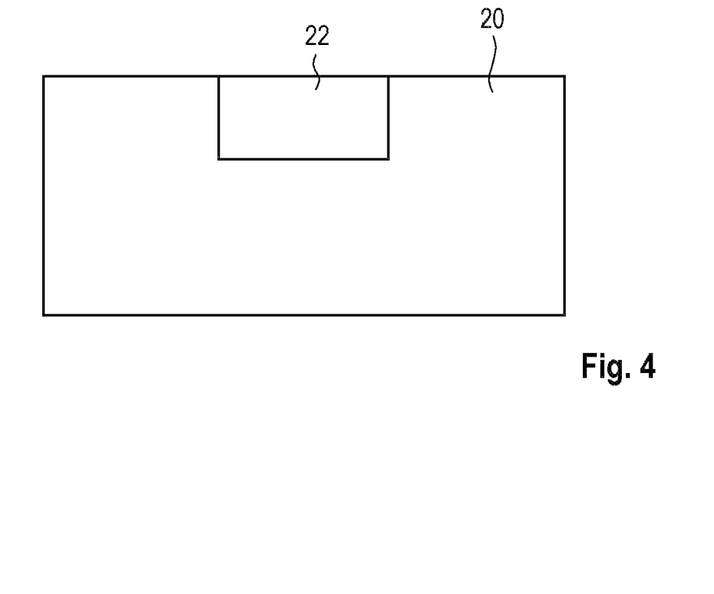
FIG. 4 schematically illustrates a front view of the windshield of FIG. 3.

FIG. 4 schematically illustrates a front view of the windshield 20 of FIG. 3. As can be seen from FIG. 4, the casing 22 may be arranged in a middle upper area of the windshield 20.

Figure 5:
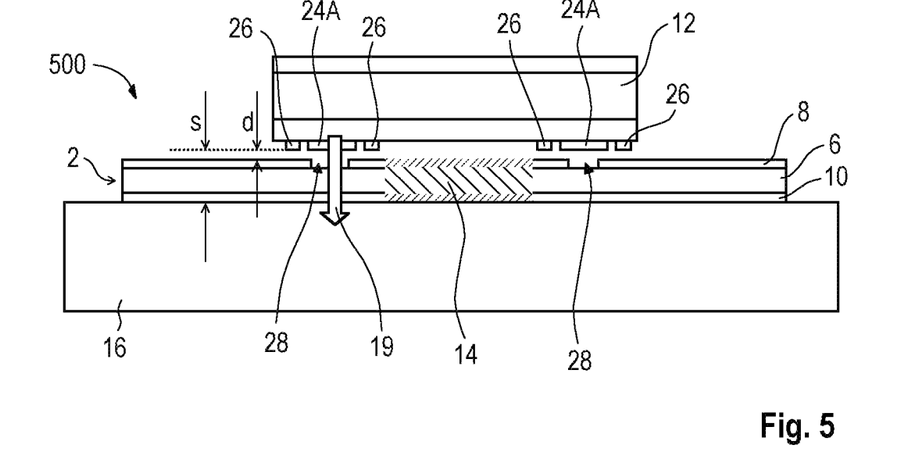
FIG. 5 schematically illustrates a cross-sectional side view of an RF device 500 in accordance with the disclosure mounted on a non-metallic component of a vehicle.

FIG. 5 schematically illustrates a cross-sectional side view of an RF device 500 in accordance with the disclosure mounted on a non-metallic component 16 of a vehicle (not shown). The RF device 500 may be at least partly similar to the RF device 200 of FIG. 200 and may include similar components. Explanations provided above in connection with FIG. 2 may therefore also be valid for the example shown in FIG. 5.

In the example of FIG. 5, an RF chip may be at least partly encapsulated in a housing 12. For the sake of simplicity, FIG. 5 only illustrates the housing 12, whereas the RF chip is not explicitly shown. In a further example, the RF chip may be a bare die which may be mounted on the conformal RF antenna 2 without an additional housing. In the example of FIG. 5, the housing 12 is exemplarily illustrated similar to the laminate 11 of FIG. 2. For example, the housing 12 may be attached to the conformal RF antenna 2 by means of an adhesive (not shown).

The RF device 500 may include one or multiple first coupling structures, such as e.g. first patch antennas 24A, which may be arranged on the lower surface of the housing 12. In addition, one or multiple ground coupling structures 26 may be arranged on the lower surface of the housing 12. Note that an exemplary top view of the lower surface of the housing 22 is shown and discussed in connection with FIG. 6.

The grounding layer 8 may include openings 28 which may be arranged opposite to the first patch antennas 24A. That is, when viewed in a direction perpendicular to e.g. the upper surface of the conformal RF antenna 2, the first patch antennas 24A and the openings 28 may at least partly overlap. This way, RF signals transmitted by the first patch antennas 24A may pass the ground layer 8 through the openings 28. A distance "d" between the first patch antennas 24A and the grounding layer 8 may be referred to as "assembly distance". When measured in the perpendicular direction, the assembly distance "d" may have a value smaller than about 100 micrometer, or smaller than about 90 micrometer, or smaller than about 80 micrometer, or even smaller than about 70 micrometer. The RF device 500 may optionally include one or multiple second coupling structures (not shown), such as e.g. second patch antennas, which may be arranged on the upper surface of the dielectric substrate 6. Note that such second coupling structures and their function are shown and described in connection with FIG. 13.

The ground coupling structures 26 may be arranged opposite to the ground layer 8. That is, when viewed in a direction perpendicular to e.g. the upper surface of the conformal RF antenna 2, the ground coupling structures 26 and the ground layer 8 may at least partly overlap. Thereby, a non-galvanic coupling between the ground coupling structures 26 and the ground layer 8 may be enhanced for grounding the RF device 500 or its components. In the example of FIG. 5, the grounding of the RF device 500 or its components may be established non-galvanically. In a further example, the grounding of the RF device 500 may be realized by an electrical conductor.

In the example of FIG. 5, a region underneath the housing 12 is illustrated by hatched areas. In one example, the hatched areas may correspond to a hollow cavity 14 formed in the conformal RF antenna 2 as already described in connection with FIG. 2. The cavity 14 may be configured to improve a dissipation of waste heat generated by the RF device 500 towards the non-metallic component 16. In further examples, the cavity 14 may be filled with at least one of a thermal paste or a thermal pad.

During an operation of the RF device 500, a high frequency circuit of an RF chip in the housing 12 may generate RF signals which may be coupled into the conformal RF antenna 2. In particular, the RF signals may be wirelessly or non-galvanically transmitted from the first patch antennas 24A to the antenna layer 10, for example based on capacitive coupling. Here, the RF signals transmitted by the first patch antennas 24A may pass the openings 28 in the ground layer 8 and the dielectric substrate 6 and may be wirelessly or non-galvanically coupled into transmitting antenna elements of the antenna layer 10. The RF signals may be radiated by the transmitting antenna elements of the antenna layer 10. In a similar fashion, RF signals may be received by receiving antenna elements of the antenna layer 10 and forwarded to the circuitry of the RF chip.

A distance "s" between the first patch antennas 24A and the antenna layer 10 may be referred to as "signal distance". When measured in the perpendicular direction, the signal distance "s" may have a value smaller than a value of a wavelength of the RF signals transmitted between the first patch antennas 24A and the antenna layer 10. For example, the signal distance "s" may have a value smaller than about 250 micrometer, or smaller than about 230 micrometer, or smaller than about 210 micrometer, or even smaller than about 190 micrometer. In this connection, the ground layer 8 may have a thickness in a range from about 10 micrometer to about 30 micrometer, the dielectric substrate 6 may have a thickness in a range from about 90 micrometer to about 110 micrometer, and the antenna layer 10 may have a thickness in a range from about 10 micrometer to about 30 micrometer.

Figure 6:
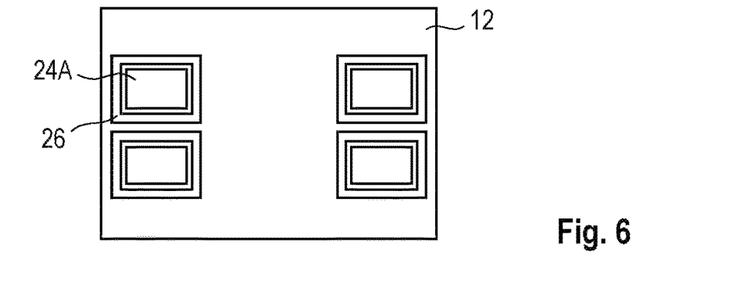
FIG. 6 schematically illustrates a top view of a housing including an RF chip.

FIG. 6 schematically illustrates a top view of a housing 12 including an RF chip. For example, the housing 12 may be similar to the housing 12 of FIG. 5. One or multiple coupling structures, such as e.g. patch antennas 24A, may be arranged over a surface of the housing 12. In addition, one or multiple of the patch antennas 24A may be surrounded by a ground coupling structure 26, respectively. For example, a patch antenna 24A may be formed by a rectangular metal surface, and the ground coupling structure 26 may surround the patch antenna 24A in a rectangular frame shape. Each of the patch antennas 24A may be configured to radiate RF signals, such as e.g. radar signals or microwave signals, originally generated by an RF chip and to non-galvanically couple the RF signals into another patch antenna. In the example of FIG. 6, four patch antennas 24A and four ground coupling structures 26 are shown. In further examples, the number of patch antennas and ground coupling structures may arbitrarily differ and may particularly depend on the specific type of a considered RF device.

Figure 7:
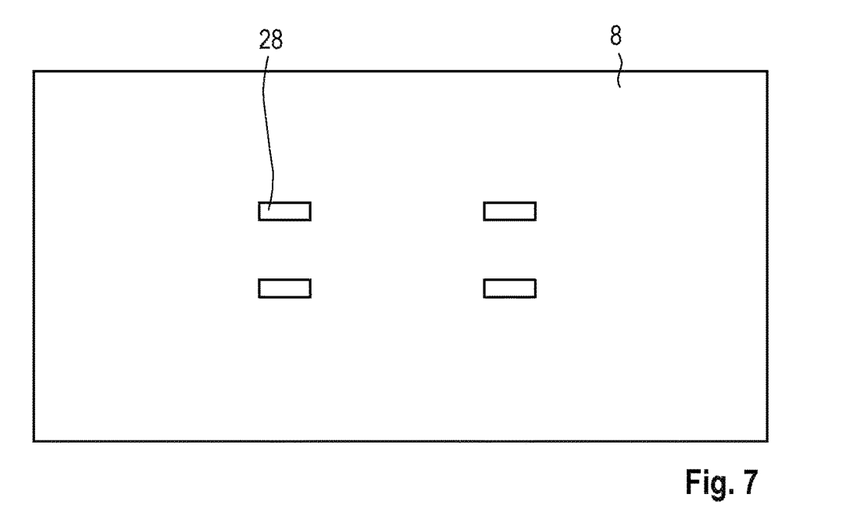
FIG. 7 schematically illustrates a top view of a ground layer of a conformal RF antenna.

FIG. 7 schematically illustrates a top view of a ground layer 8 of a conformal RF antenna. For example, the ground layer 8 may be similar to the ground layer 8 of FIG. 5. The ground layer 8 may include one or multiple holes or openings 28. In the example of FIG. 7, four openings 28 are illustrated in accordance with the number of patch antennas 24A shown in FIG. 6. The openings 28 may provide signal pathways for RF signals through the ground layer 8. For the case of the conformal RF antenna 2 including a cavity 14, as e.g. shown in FIG. 5, the ground layer 8 may include one or multiple additional openings (not shown) which may be arranged over the cavity 14. That is, when viewed in a direction perpendicular to e.g. the surface of ground layer 8, the one or multiple additional openings and the cavity 14 may at least partly overlap.

Figure 8:
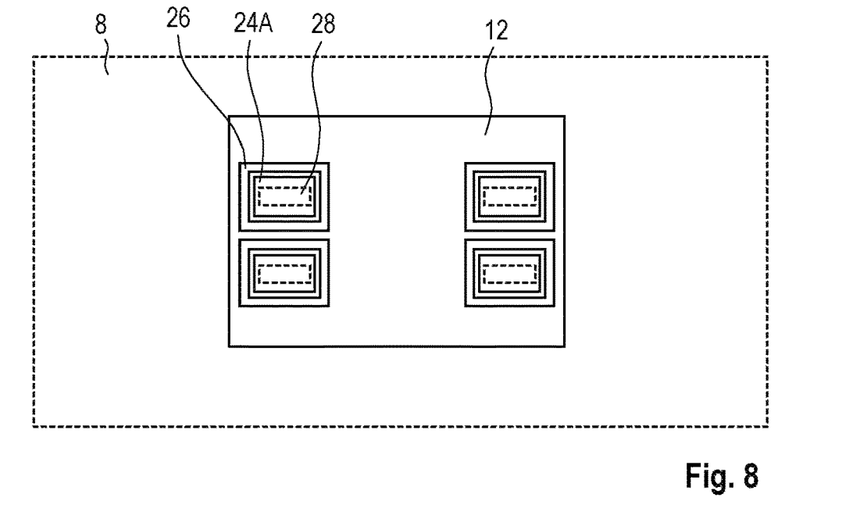
FIG. 8 schematically illustrates a top view of a housing including an RF chip arranged over a ground layer of a conformal RF antenna.

FIG. 8 schematically illustrates a top view of a housing 12 including an RF chip arranged over a ground layer 8 of a conformal RF antenna. For example, the arrangement of FIG. 8 may be obtained by arranging the housing 12 of FIG. 6 and the ground layer 8 of FIG. 7 over each other. In particular, the openings 28 may be aligned with the patch antennas 24A. That is, when viewed in a direction perpendicular to e.g. the upper surface of the ground layer 8, the openings 28 and the patch antennas 24A may at least partly overlap. Note that the grounding layer 8 may be coupled around each one of the RF channels, i.e. the signal pathways of the RF signals, for a better isolation between the RF channels.

Figure 9:
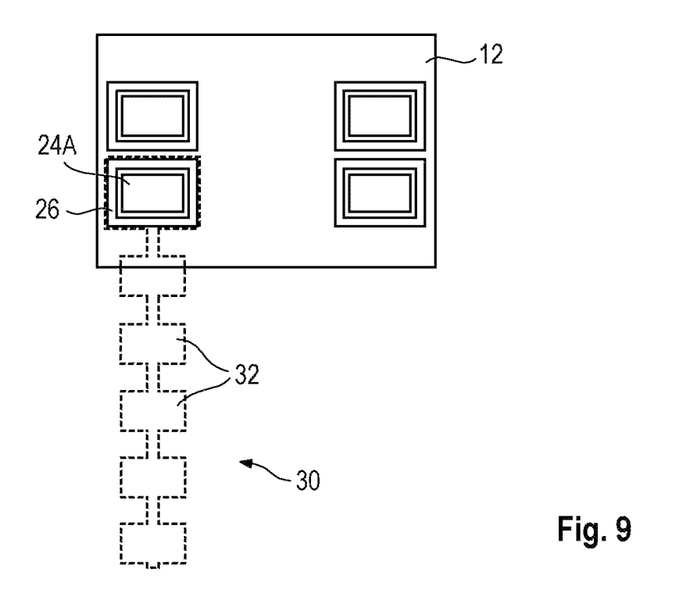
FIG. 9 schematically illustrates a top view of a housing including an RF chip and an antenna element of an antenna layer of a conformal RF antenna.

FIG. 9 schematically illustrates a top view of a housing 12 including an RF chip, and an antenna element of an antenna layer of a conformal RF antenna. For example, the housing 12 of FIG. 9 may be similar to the housing 12 of FIG. 6. In the example of FIG. 9, the patch antenna 24A arranged over the lower left side of the housing 12 may be configured to couple an RF signal into an antenna element 30 of an antenna layer of a conformal RF antenna. The antenna element 30 may include multiple conductive patches (or patch antennas) 32 which may be electrically connected, in particular in the form of a patch column or a patch branch. Note that an antenna layer of a conformal RF antenna may include one or multiple such antenna elements, for example transmitting antenna elements and/or receiving antenna elements. An example of a more detailed patch antenna array including multiple transmitting and receiving antenna elements is shown and discussed in connection with FIG. 17.

Figure 10:
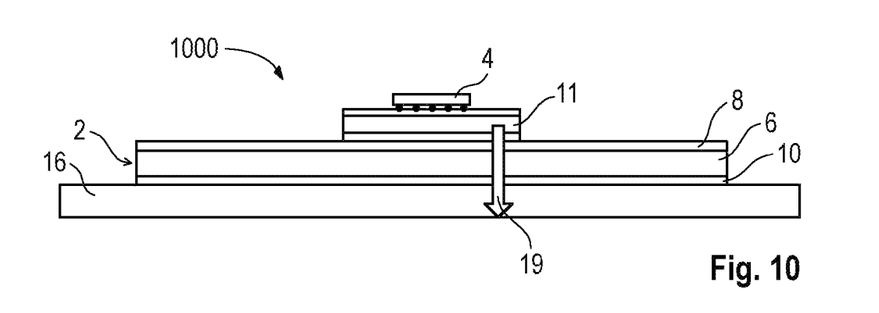
FIG. 10 schematically illustrates a cross-sectional side view of an RF device 1000 in accordance with the disclosure mounted on a non-metallic component of a vehicle.

FIG. 10 schematically illustrates a cross-sectional side view of an RF device 1000 in accordance with the disclosure mounted on a non-metallic component 16 of a vehicle (not shown). The RF device 1000 may be similar to the RF device of FIG. 2. In contrast to FIG. 2, the RF device 1000 may not necessarily include a cavity 14 arranged underneath the BGA laminate 11 and/or the RF chip 4. That is, the dielectric substrate 6 may be formed continuous. Note that patch antennas arranged on the lower surface of the BGA laminate 11 and the upper surface of the ground layer 8 are not explicitly illustrated for the sake of simplicity.

Figure 11:
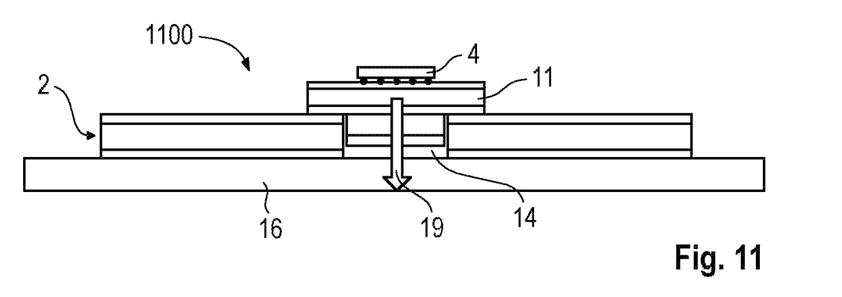
FIG. 11 schematically illustrates a cross-sectional side view of an RF device 1100 in accordance with the disclosure mounted on a non-metallic component of a vehicle.

FIG. 11 schematically illustrates a cross-sectional side view of an RF device 1100 in accordance with the disclosure mounted on a non-metallic component 16 of a vehicle (not shown). In contrast to FIG. 2, the BGA laminate 11 may include a part which may be at least partly arranged in the cavity 14. In further examples, any type of housing at least partly encapsulating the RF chip 4 may at least partly extend into the cavity 14 of the conformal RF antenna 2. In the example of FIG. 11, the BGA laminate 11 may include a first portion arranged outside of the cavity 14 and a second portion extending into the cavity 14. For example, the first part and the second part of the BGA laminate 11 may form a step. The arrangement of the BGA laminate 11 in the cavity 14 may improve a dissipation of waste heat towards the non-metallic component 16 compared to an RF device including a hollow cavity 14. In addition, an antenna structure arranged on the lower surface of the BGA laminate 11 may be arranged closer to an antenna layer of the conformal RF antenna 2.

Figure 12:
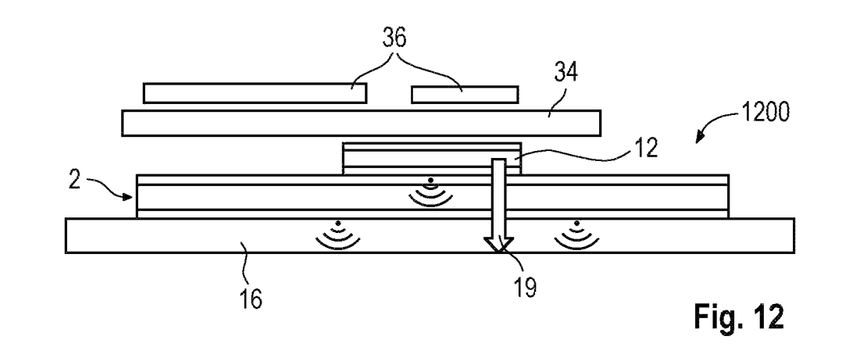
FIG. 12 schematically illustrates a cross-sectional side view of an RF device 1200 in accordance with the disclosure mounted on a non-metallic component of a vehicle.

FIG. 12 schematically illustrates a cross-sectional side view of an RF device 1200 in accordance with the disclosure mounted on a non-metallic component 16 of a vehicle (not shown). For example, the RF device 1200 may be at least partly similar to the RF device 500 of FIG. 5. The RF device 1200 may include an RF chip which may be arranged inside of a housing 12 and is thus not explicitly illustrated. The RF device 1200 may be mounted on a surface of a circuit board 34. That is, the RF device 1200 may be electrically and mechanically coupled to the circuit board 34. In addition, one or multiple electronic components 36 may be arranged on the circuit board 34. In the example of FIG. 12, the RF device 1200 and the electronic components 36 may be mounted on opposite surfaces of the circuit board 34. In a further example, the RF device 1200 and the electronic components 36 may be mounted on a same surface of the circuit board 34. For example, the electronic components 36 may include at least one of a micro controller unit, a bus system for e.g. real time control applications, a crystal oscillator, etc. The circuit board 34 may be connected to a power supply (not shown) and a data connection (not shown) to a central processor of the vehicle.

Figure 13:
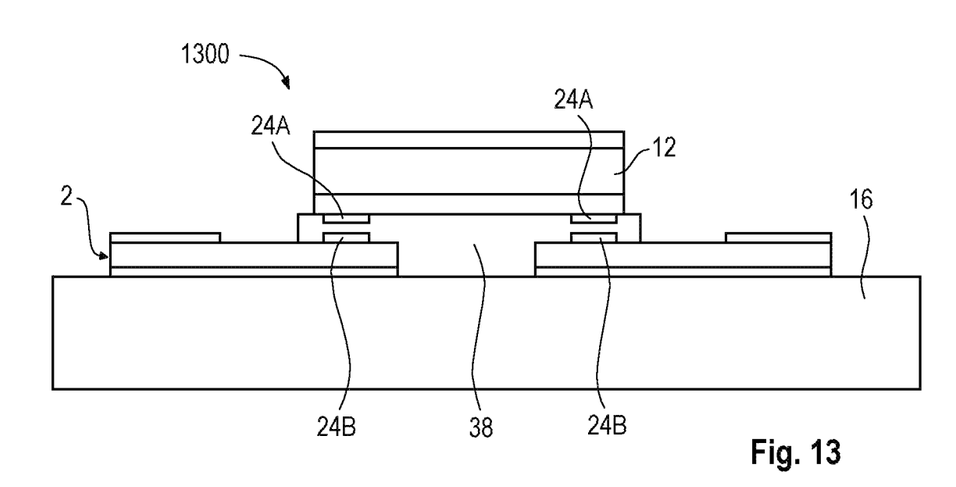
FIG. 13 schematically illustrates a cross-sectional side view of an RF device 1300 in accordance with the disclosure mounted on a non-metallic component of a vehicle.

FIG. 13 schematically illustrates a cross-sectional side view of an RF device 1300 in accordance with the disclosure mounted on a non-metallic component 16 of a vehicle (not shown). For example, the RF device 1300 may be at least partly similar to the RF device 500 of FIG. 5. In contrast to FIG. 5, the RF device 1300 may further include one or multiple second coupling structures, such as e.g. second patch antennas 24B, which may be arranged on the upper surface of the dielectric substrate 6. The second patch antennas 24B may be arranged opposite to the first patch antennas 24A. That is, when viewed in a direction perpendicular to e.g. the upper surface of the conformal RF antenna 2, the first and second patch antennas 24A, 24B may at least partly overlap. This way, a non-galvanic coupling between opposite patch antennas 24A, 24B may be enhanced for non-galvanically transmitting RF signals from the first patch antennas 24A to the second patch antennas 24B and vice versa. A patch distance between opposite first and second patch antennas 24A, 24B, when measured in the perpendicular direction, may have a value smaller than a value of a wavelength of the RF signals transmitted between the patch antennas. For example, the patch distance may have a value smaller than about 100 micrometer, or smaller than about 90 micrometer, or smaller than about 80 micrometer, or even smaller than about 70 micrometer. Note that the patch distance may correspond to the assembly distance "d" in FIG. 5.

During an operation of the RF device 1300, a high frequency circuit of an RF chip in the housing 12 may generate RF signals which may be coupled into the conformal RF antenna 2. In particular, the RF signals may be wirelessly or non-galvanically transmitted from the first patch antennas 24A to the second patch antennas 24B, for example based on capacitive coupling. The RF signals may pass the dielectric substrate 6 and may be wirelessly or non-galvanically coupled into transmitting antenna elements of the antenna layer 10. The RF signals may be radiated by the transmitting antenna elements of the antenna layer 10. In a similar fashion, RF signals may be received by receiving antenna elements of the antenna layer 10 and forwarded to the circuitry of the RF chip.

The housing 12 may be attached to the conformal RF antenna 2 by means of an adhesive 38. In the example of FIG. 13, the act of mounting the housing 12 to the conformal RF antenna 2 may lead to a horizontal and/or a vertical misalignment of opposite patch antennas 24A and 24B which may result in a reduction of RF performance. In addition, a spill of the adhesive 38 at the side surfaces of the housing 12 may occur.

Figure 14:
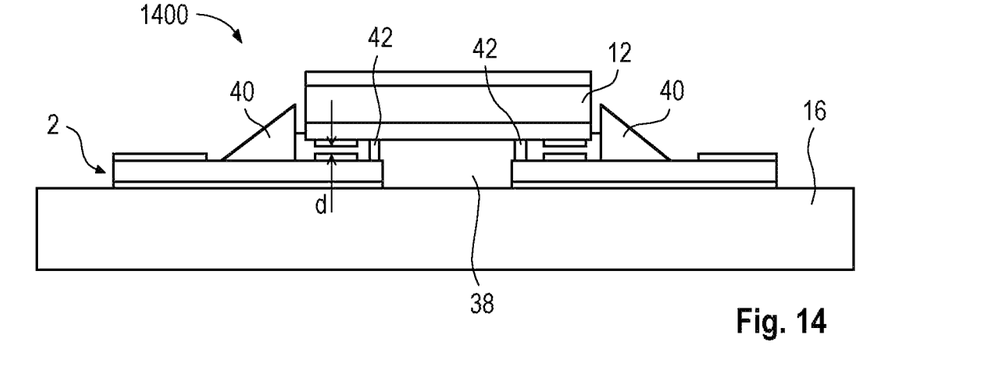
FIG. 14 schematically illustrates a cross-sectional side view of an RF device 1400 in accordance with the disclosure mounted on a non-metallic component of a vehicle.

FIG. 14 schematically illustrates a cross-sectional side view of an RF device 1400 in accordance with the disclosure mounted on a non-metallic component 16 of a vehicle (not shown). The RF device 1400 may be at least partly similar to the RF device 1300 of FIG. 13. In contrast to FIG. 13, the RF device 1400 may include one or multiple frame structures 40 mounted on the conformal RF antenna 2. For example, the frame structure 40 may be glued to the conformal RF antenna 2 by means of an adhesive. In the side view of FIG. 14, the frame structure 40 is illustrated to be arranged to the left and to the right of the housing 12. In a corresponding top view of the RF device 1400, the frame structure 40 may at least partly surround the housing 12. In this regard, the frame structure 40 may have one of a circular shape, an elliptic shape, a rectangular shape, a polygonal shape, etc. In one specific example, the frame structure 40 may completely surround the housing 12. The frame structure 40 may be configured to reduce a placement tolerance of the housing 12 in the horizontal direction. This way, a horizontal misalignment of opposite patch antennas 24A and 24B may be reduced or avoided.

In contrast to FIG. 13, the RF device 1400 may include one or multiple spacer structures 42 which may be arranged between the upper surface of the conformal RF antenna 2 and the lower surface of the housing 12. The spacer structure(s) 42 may be configured to provide a predefined distance between the conformal RF antenna 2 and the housing 12. This way, a patch distance "d" in the vertical direction between opposite patch antennas 24A and 24B may be adjustable and controllable.

In the example of FIG. 14, the adhesive 38 is illustrated to have a substantially homogenous consistency. In a further example, an additional thermal pad may be arranged in the adhesive 38. In yet a further example, the adhesive 38 may contain additional filler particles configured to increase a thermal conductivity of the filled adhesive 38. The filler particles may e.g. include at least one of boron nitride, aluminum nitride, metals, etc.

Figure 15:
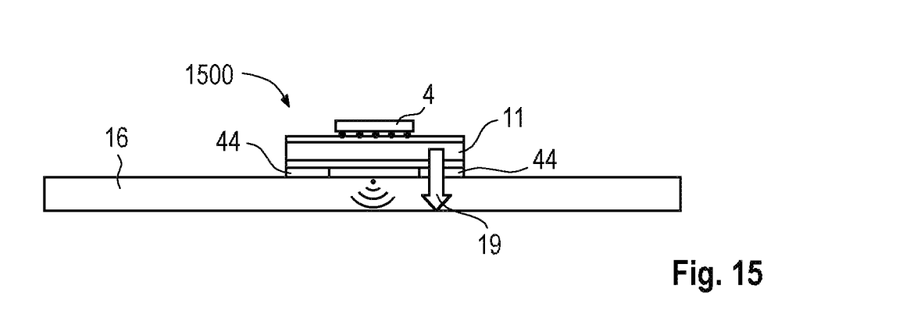
FIG. 15 schematically illustrates a cross-sectional side view of a system 1500 in accordance with the disclosure.

FIG. 15 schematically illustrates a cross-sectional side view of a system 1500 in accordance with the disclosure. The system 1500 may include a non-metallic component 16 of a vehicle (not shown). In addition, the system 1500 may include a BGA laminate 11 mounted on the non-metallic component 16 by means of an adhesion promoter 44. In one example, the adhesion promoter 44 may be one of an adhesive, glue, a lamination foil, etc. In addition, an RF chip 4 may be mounted on the BGA laminate 11, for example based on a flip chip mounting technique.

In a further example of a system according to the disclosure, no BGA substrate 11 may be arranged between the RF chip 4 and the non-metallic component 16. Rather, a housing at least partly encapsulating the RF chip 4 may be attached to the non-metallic component 16 by means of the adhesion promoter 44. In yet a further example for a system in accordance with the disclosure, the RF chip 4 may be a bare die mounted on the non-metallic component 16 by the adhesion promoter 44. In contrast to previously described examples, such as e.g. the example of FIG. 2, the system 1500 may not necessarily include a conformal RF antenna 2 on which the RF chip 4 may be mounted. Rather, the RF chip 4 may include a suitable RF antenna configured to radiate RF signals, wherein the RF antenna may e.g. be arranged on the lower surface of the RF chip 4.

Figure 16:
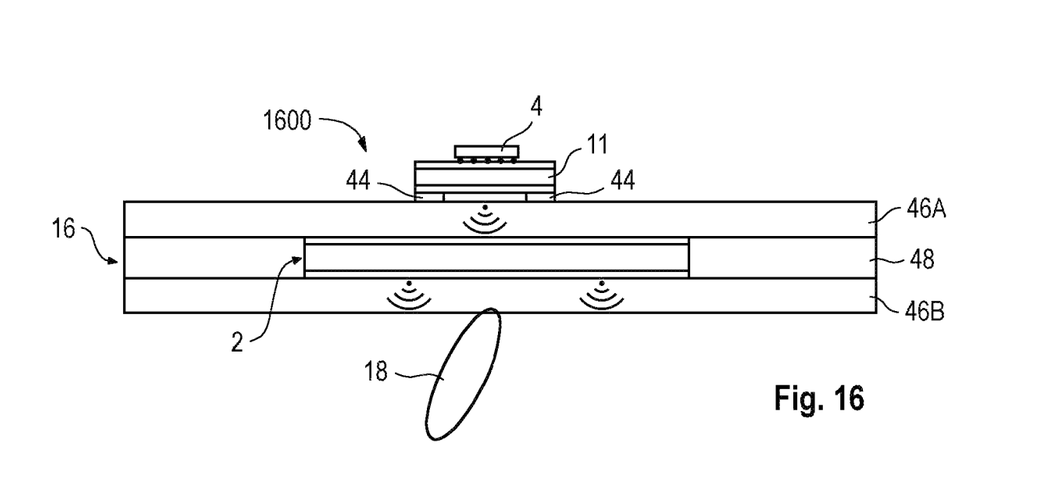
FIG. 16 schematically illustrates a cross-sectional side view of a system 1600 in accordance with the disclosure.

FIG. 16 schematically illustrates a cross-sectional side view of a system 1600 in accordance with the disclosure. The system 1600 may be at least partly similar to the system 1500 of FIG. 5. In contrast to FIG. 15, the system 1600 may include a conformal RF antenna 2 which may be embedded in the non-metallic component 16. For example, the conformal RF antenna 2 may be similar to any of the conformal RF antennas described in connection with previous examples. The RF chip 4 and the conformal RF antenna 2 may be non-galvanically or wirelessly coupled.

In the example of FIG. 16, the non-metallic component 16 may be a window or a windshield of a vehicle. The windshield 16 may include a first glass layer 46A, a second glass layer 46B, and an optional shading layer 48 arranged in between. The conformal RF antenna 2 may be arranged between the first glass layer 46A and the second glass layer 46B. In particular, the conformal RF antenna 2 may be at least partly embedded in the shading layer 48. In a further example, the conformal RF antenna 2 may be at least partly embedded in one of the glass layers 46A, 46B.

Figure 17:
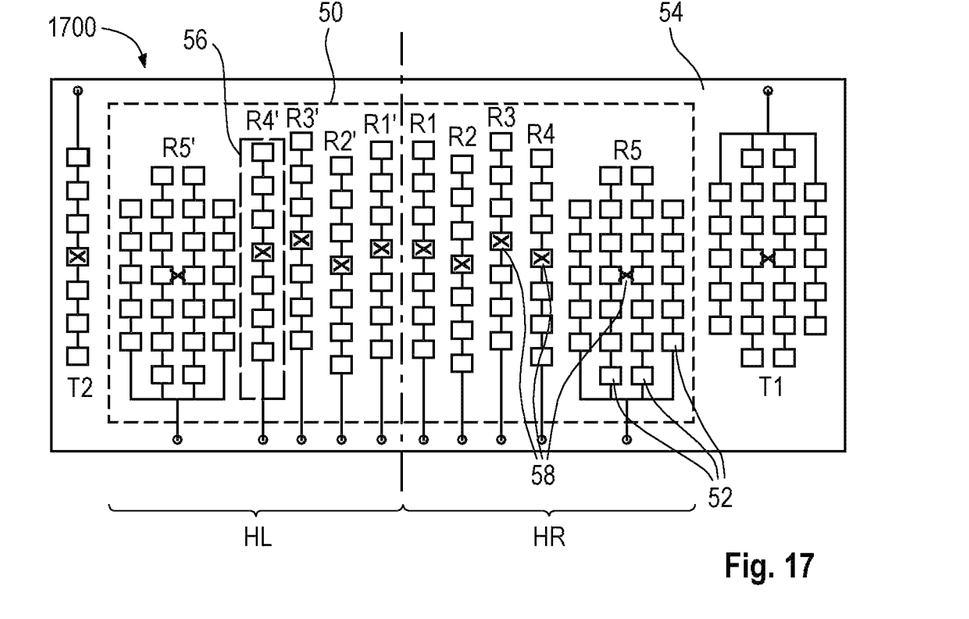
FIG. 17 schematically illustrates a top view of a radar patch antenna 1700.

FIG. 17 schematically illustrates a top view of a radar patch antenna 1700. For example, the radar patch antenna 1700 may be used as a conformal RF antenna in an RF device in accordance with the disclosure. In particular, an antenna layer of a conformal RF antenna in accordance with the disclosure may include antenna elements similar to the antenna elements of the radar patch antenna 1700.

The radar patch antenna 1700 may be formed as an antenna array arrangement. The radar patch antenna 1700 may include a patch field 50 which may also be called a receiving antenna field. The patch field 50 may include multiple conductive patches (or patch antennas) 52. The patches 52 may be arranged on a common dielectric substrate 54. For example, the substrate 54 may be similar to the dielectric substrate 6 described in connection with previous examples. A portion of the conductive patches 52 may be electrically connected to form a subset 56, in particular having the form of a patch column or a patch branch. Each single subset 56 or any group of subsets 56 may constitute an antenna element structure and thus may define a receiving antenna element R1-R5, R1'-R5'. The shape and the size of the subset 56 of patches 52 may define a directional characteristic of a sensitivity lobe of the respective receiving antenna element R1-R5, R1'-R5'. Each receiving antenna element may have a phase center 58 indicating an effective center of a radar sensitivity lobe of this antenna element.

In the example of FIG. 17, the antenna array arrangement or the patch field 50 may be divided into a left half HL and a right half HR. In the right half HR, four short range receiving antenna elements R1-R4 (i.e. receiving antenna elements with small lateral aperture width) and one receiving antenna element R5 for long range detection may be positioned. Between the left half HL and the right half HR a symmetry axis A may be arranged. According to a symmetric arrangement of the antenna array, the left half HL also may include four short range receiving antenna elements R1'-R4' and one long range receiving antenna element R5'.

The radar patch antenna 1700 may further include one or multiple separate transmitting antenna elements T1-T2. For example, the antenna element 30 of FIG. 9 may be similar to one of the transmitting antenna elements T1-T2. In the example of FIG. 17, the radar patch antenna 1700 may include two transmitting antenna elements T1-T2 which may be arranged on the same substrate 54 with the receiving antenna field 50. The transmitting antenna elements T1-T2 may be arranged in any arbitrary way. Alternatively or additionally to the transmitting antenna elements T1-T2, any of the receiving antenna elements R1-R5, R1'-R5' may be co-used as a transmitting antenna element. An antenna that is used as both transmitter and receiver may act as transceiver and receiver simultaneously, for example by the use of a circulator. The one or multiple transmitting antenna elements T1-T2 may be placed according to a same non-linear arrangement pattern as the receiving antenna elements.

Figure 18:
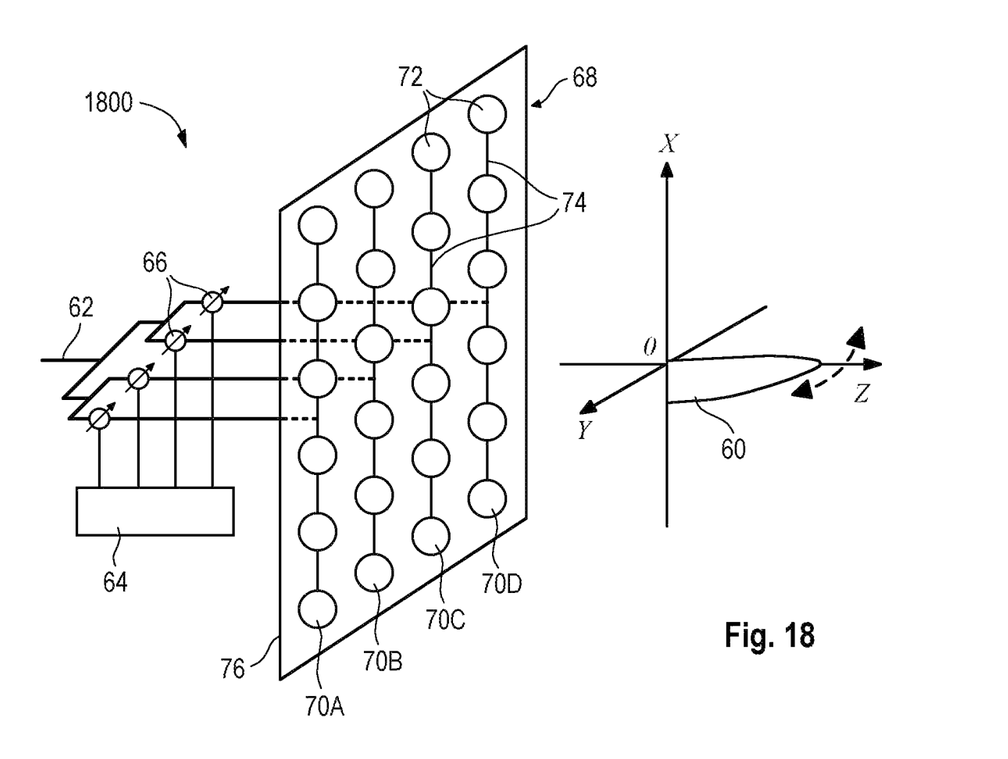
FIG. 18 schematically illustrates a one-dimensional scan phased array conformal RF antenna and its radiation pattern.

FIG. 18 schematically illustrates a one-dimensional scan phased array conformal RF antenna 1800 and its radiation pattern 60. For example, the phased array conformal RF antenna 1800 may be used as a conformal RF antenna in an RF device in accordance with the disclosure. In particular, an antenna layer of a conformal RF antenna in accordance with the disclosure may include antenna elements similar to the antenna elements of the phased array conformal RF antenna 1800 of FIG. 18.

The one-dimensional scan phased array conformal RF antenna 1800 may be configured to scan a radiating beam or main lobe in a horizontal direction by electronically changing the phase of the electromagnetic energy supplied to the individual radiation sub-arrays. The one-dimensional scan phased array antenna 1800 may include an RF signal input port 62, a controller 64, a phase control means including a plurality of phase shifters 66, and a radiation element array 68. The radiation element array 68 may include a plurality of sub-arrays 70A-70D. Each sub-array may include a plurality of radiating elements 72 which may be connected via feed lines 74 and mounted on a grounded low loss dielectric substrate 76. For example, the substrate 76 may be similar to the dielectric substrate 6 described in connection with previous examples. Note that the RF antenna 1800 may be configured to transmit and/or receive RF signals.

The phase shifters 66 may be configured to shift phases of an RF signal fed into the input port 62 and forwarded to the phase shifters 66. The controller 64 may be configured to control the phase shifters 66 and thus the phase shifts applied to the RF signal. For example, at least one of the controller 64 and the phase shifters 66 may be a part of an RF chip of an RF device in accordance with the disclosure. For each sub-array in the radiation element array 68, the phase may be controlled to get a desired radiation direction in a plane vertical to the sub-array, i.e. the y-z plane. In the example of FIG. 18, the radiation direction may be adjustable in the y-z plane. The radiation pattern 60 may change its beam direction electronically in the y-z plane with a fixed designed pattern in the x-z plane, for example, cosecant-square and pencil beam patterns. In the example of FIG. 18, the radiation direction may be adjustable in the azimuthal y-z. In further examples, the scanning of the phased array antenna may also be performed in the elevation direction.

Figure 19:
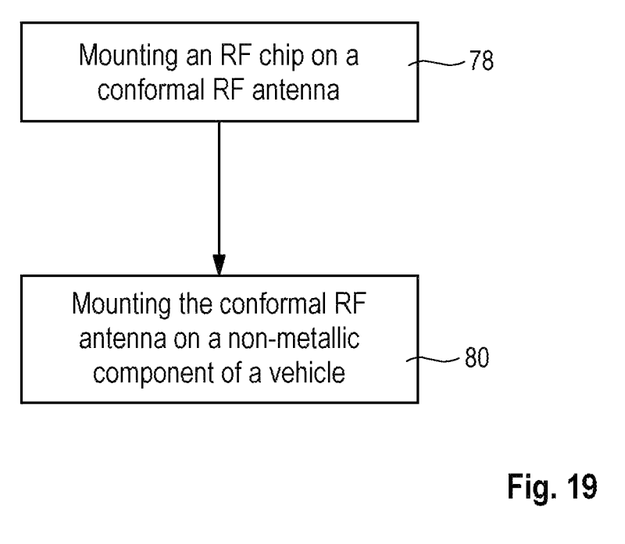
FIG. 19 illustrates a flowchart of a method in accordance with the disclosure.

FIG. 19 illustrates a flowchart of a method in accordance with the disclosure. The method may be used for manufacturing an RF device in accordance with the disclosure. Accordingly, the method may be read in connection with RF devices in accordance with the disclosure as described in previous examples. At 78, an RF chip 4 is mounted on a conformal RF antenna 2. At 80, the conformal RF antenna 2 is mounted on a non-metallic component 16 of a vehicle.

In one example, the RF chip 4 may be mounted on the conformal RF antenna 2 before the conformal RF antenna 2 is mounted on the non-metallic component 16. In a further example, the conformal RF antenna 2 may be mounted on the non-metallic component 16 before the RF chip 4 is mounted on the conformal RF antenna 2.

In further optional acts of the method of FIG. 19 (see also FIG. 14), a frame structure 40 may be mounted on the conformal RF antenna 2 before the RF chip 4 is mounted on the conformal RF antenna 2. An adhesive 38 may be arranged on the conformal RF antenna 2, wherein the adhesive 38 may be bounded by the frame structure 40. In addition, the RF chip 4 may be arranged on the adhesive 38.

In a further optional act of the method of FIG. 19 (see also FIG. 14), before mounting the RF chip 4, at least one spacer structure 42 may be arranged on the conformal RF antenna 2. The at least one spacer structure 42 may be configured to provide a predefined distance between the RF chip 4 and the conformal RF antenna 2.

Examples

In the following, RF devices including conformal antennas and methods for manufacturing thereof will be explained by means of examples.

Example 1 is a method, comprising: a conformal RF antenna configured to be mounted on a non-metallic component of a vehicle and configured to operate at frequencies higher than 10 GHz; and an RF chip mounted on the conformal RF antenna and electrically coupled to the conformal RF antenna to transfer an RF signal of a frequency higher than 10 GHz to the conformal RF antenna.

Example 2 is an RF device according to Example 1, wherein the electrical coupling between the RF chip and the conformal RF antenna is non-galvanic or wireless.

Example 3 is an RF device according to Example 1 or 2, wherein: the conformal RF antenna is a conformal radar antenna, and the RF chip is a radar chip.

Example 4 is an RF device according to one of the preceding Examples, wherein the non-metallic component comprises at least one of a window, a lighting cover, or a mirror casing.

Example 5 is an RF device according to one of the preceding Examples, wherein the conformal RF antenna is configured to provide a thermal path for dissipating thermal energy generated by the RF chip in a direction towards the non-metallic component.

Example 6 is an RF device according to one of the preceding Examples, further comprising: a housing, wherein the RF chip is at least partly encapsulated in the housing and the conformal RF antenna is arranged external to the housing.

Example 7 is an RF device according to Example 6, wherein the housing comprises at least one of a laminate, a circuit board, a semiconductor package, a wafer level semiconductor package, or a panel level semiconductor package.

Example 8 is an RF device according to one of the preceding Examples, wherein the RF chip comprises a coupling structure configured to couple an RF signal provided by the RF chip into the conformal RF antenna.

Example 9 is an RF device according to one of the preceding Examples, wherein: the conformal RF antenna comprises a phased array antenna, and the RF chip is configured to drive the phased array antenna to adjust a main lobe of the conformal RF antenna.

Example 10 is an RF device according to one of the preceding Examples, wherein the conformal RF antenna comprises: a flexible dielectric substrate; and at least one patterned metal layer arranged over a main surface of the dielectric substrate, wherein the patterned metal layer forms at least one radiating element.

Example 11 is an RF device according to Example 10, wherein: the dielectric substrate comprises a cavity, and the RF chip is arranged over the cavity.

Example 12 is an RF device according to Example 11, wherein the cavity is filled with at least one of a thermal paste or a thermal pad.

Example 13 is an RF device according to one of the preceding Examples, further comprising: a ball grid array laminate arranged between the RF chip and the conformal RF antenna, wherein the RF chip is mounted on the ball grid array laminate by a flip chip mounting technique.

Example 14 is an RF device according to one of the preceding Examples, further comprising: a frame structure mounted on the conformal RF antenna and at least partly surrounding the RF chip.

Example 15 is a method, comprising: mounting an RF chip on a conformal RF antenna; and mounting the conformal RF antenna on a non-metallic component of a vehicle.

Example 16 is a method according to Example 15, wherein the RF chip is mounted on the conformal RF antenna before the conformal RF antenna is mounted on the non-metallic component.

Example 17 is a method according to Example 15, wherein the conformal RF antenna is mounted on the non-metallic component before the RF chip is mounted on the conformal RF antenna.

Example 18 is a method according to one of Examples 15 to 17, further comprising: before mounting the RF chip, mounting a frame structure on the conformal RF antenna; arranging an adhesive on the conformal RF antenna, wherein the adhesive is bounded by the frame structure; and arranging the RF chip on the adhesive.

Example 19 is a method according to one of Examples 15 to 18, further comprising: before mounting the RF chip, arranging at least one spacer structure on the conformal RF antenna, wherein the at least one spacer structure is configured to provide a predefined distance between the RF chip and the conformal RF antenna.

Example 20 is a system, comprising: a non-metallic component of a vehicle; and an RF chip mounted on the non-metallic component by an adhesion promoter.

Example 21 is a system according to Example 20, further comprising: a conformal RF antenna embedded in the non-metallic component, wherein the RF chip and the conformal RF antenna are non-galvanically or wirelessly coupled.

Example 22 is a system according to Example 20 or 21, wherein the conformal RF antenna is arranged between a first glass layer and a second glass layer of a window.

As employed in this specification, the terms "connected", "coupled", "electrically connected", and/or "electrically coupled" may not necessarily mean that elements must be directly connected or coupled together. Intervening elements may be provided between the "connected", "coupled", "electrically connected", or "electrically coupled" elements.

Further, the word "over" used with regard to e.g. a material layer formed or located "over" a surface of an object may be used herein to mean that the material layer may be located (e.g. formed, deposited, etc.) "directly on", e.g. in direct contact with, the implied surface. The word "over" used with regard to e.g. a material layer formed or located "over" a surface may also be used herein to mean that the material layer may be located (e.g. formed, deposited, etc.) "indirectly on" the implied surface with e.g. one or multiple additional layers being arranged between the implied surface and the material layer.

Furthermore, to the extent that the terms "having", "containing", "including", "with", or variants thereof are used in either the detailed description or the claims, such terms are intended to be inclusive in a manner similar to the term "comprising". That is, as used herein, the terms "having", "containing", "including", "with", "comprising", and the like are open-ended terms that indicate the presence of stated elements or features, but do not preclude additional elements or features. The articles "a", "an", and "the" are intended to include the plural as well as the singular, unless the context clearly indicates otherwise.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or multiple" unless specified otherwise or clear from context to be directed to a singular form. Also, at least one of A and B or the like generally means A or B or both A and B.

Devices and methods for manufacturing devices are described herein. Comments made in connection with a described device may also hold true for a corresponding method and vice versa. For example, if a specific component of a device is described, a corresponding method for manufacturing the device may include an act of providing the component in a suitable manner, even if such act is not explicitly described or illustrated in the figures.

Although the disclosure has been shown and described with respect to one or multiple implementations, equivalent alterations and modifications will occur to others skilled in the art based at least in part upon a reading and understanding of this specification and the annexed drawings. The disclosure includes all such modifications and alterations and is limited only by the concept of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or multiple other features of the other implementations as may be desired and advantageous for any given or particular application.

What is claimed is:

1. A radio frequency (RF) device, comprising:
a conformal RF antenna comprising a ground layer, an antenna layer comprising at least one radiating element, and a flexible dielectric substrate interposed between the ground layer and the antenna layer, wherein the ground layer, the antenna layer, and the flexible dielectric substrate are stacked in a stacking direction to form a multi-layer stack;

a coupling structure comprising an antenna, wherein the coupling structure is mounted on the conformal RF antenna; and an RF chip configured to generate an RF signal, wherein the RF chip is mounted on the ground layer of the conformal RF antenna, wherein the RF chip and the conformal RF antenna are arranged on opposing sides of the coupling structure, wherein the ground layer comprises an opening that extends in the stacking direction through the ground layer, and wherein the opening is aligned with the antenna of the coupling structure such that the opening and the antenna overlap in the stacking direction, and wherein the RF chip is configured to transfer the RF signal to the conformal RF antenna via an electrical coupling using the antenna of the coupling structure.

2. The RF device of claim 1, wherein the electrical coupling between the RF chip and the conformal RF antenna is a non-galvanic coupling or a wireless coupling.

3. The RF device of claim 1, further comprising:
a cavity that extends through the ground layer, the flexible dielectric substrate, and the antenna layer, wherein the cavity is configured to provide a thermal path for dissipating thermal energy generated by the RF chip in a direction away from the RF chip.

4. The RF device of claim 1, wherein:
the antenna layer comprises a plurality of radiating elements that form a phased array antenna, and
the RF chip is configured to drive the phased array antenna to adjust a main lobe of the conformal RF antenna.

5. The RF device of claim 1, wherein the antenna layer includes at least one patterned metal layer arranged on a main surface of the flexible dielectric substrate, wherein the at least one patterned metal layer forms the at least one radiating element.

6. The RF device of claim 3, wherein:
the RF chip is arranged over the cavity and the cavity is filled with at least one of a thermal paste or a thermal pad.

7. The RF device of claim 1, wherein the coupling structure is mounted between the RF chip and the conformal RF antenna, and
wherein the antenna of the coupling structure is configured to receive the RF signal from the RF chip and transmit the RF signal, non-galvanically or wirelessly, through the opening towards the antenna layer.

8. The RF device of claim 1, further comprising:
a frame structure mounted on the conformal RF antenna and at least partly surrounding the RF chip.

9. A method, comprising:
mounting a radio frequency (RF) chip on a coupling structure comprising an antenna; and
mounting the coupling structure on a conformal RF antenna, wherein the RF chip and the conformal RF antenna are arranged on opposing sides of the coupling structure, and wherein the conformal RF antenna comprises a ground layer, an antenna layer comprising at least one radiating element, and a flexible dielectric substrate interposed between the ground layer and the antenna layer, wherein the RF chip is mounted to the ground layer, wherein the ground layer, the antenna layer, and the flexible dielectric substrate are stacked in a stacking direction to form a multi-layer stack, and wherein the ground layer has a first surface defined by a first area that is provided in a first plane and a second surface defined by a second area that is provided in a second plane that is substantially parallel to the first plane, wherein the second surface is arranged opposite to the first surface across a first thickness dimension of the ground layer, wherein the ground layer comprises an opening that extends in the stacking direction through the first thickness dimension, and wherein the opening is aligned with the antenna of the coupling structure such that the opening and the antenna overlap in the stacking direction.

10. The method of claim 9, further comprising:
mounting the conformal RF antenna on a non-metallic component of a vehicle, wherein the RF chip is mounted on the conformal RF antenna before the conformal RF antenna is mounted on the non-metallic component.

11. The method of claim 9, further comprising:
mounting the conformal RF antenna on a non-metallic component of a vehicle, wherein the conformal RF antenna is mounted on the non-metallic component before the RF chip is mounted on the conformal RF antenna.

12. The method of claim 9, further comprising:
before mounting the RF chip on the conformal RF antenna, mounting a frame structure on the conformal RF antenna;
before mounting the RF chip on the conformal RF antenna, arranging an adhesive on the conformal RF antenna, wherein the adhesive is bounded by the frame structure; and
arranging the RF chip on the adhesive.

13. The method of claim 9, further comprising:
before mounting the RF chip on the conformal RF antenna, arranging at least one spacer structure on the conformal RF antenna, wherein the at least one spacer structure is configured to provide a predefined distance between the RF chip and the conformal RF antenna.

14. A system, comprising:
a non-metallic component of a vehicle;
a radio frequency (RF) chip mounted on the non-metallic component by an adhesion promoter; and
a conformal RF antenna embedded in the non-metallic component, wherein the RF chip and the conformal RF antenna are non-galvanically or wirelessly coupled by an electrical coupling, wherein the conformal RF antenna comprises a ground layer, an antenna layer comprising at least one radiating element, and a flexible dielectric substrate interposed between the ground layer and the antenna layer, wherein the ground layer, the antenna layer, and the flexible dielectric substrate are stacked in a stacking direction to form a multi-layer stack, a coupling structure comprising an antenna, wherein the coupling structure is mounted on the conformal RF antenna, wherein the RF chip and the conformal RF antenna are arranged on opposing sides of the coupling structure, wherein the ground layer comprises an opening that extends in the stacking direction through the ground layer, and wherein the opening is aligned with the antenna of the coupling structure such that the opening and the antenna overlap in the stacking direction, wherein the RF chip is configured to generate an RF signal, and non-galvanically or wirelessly transfer the RF signal from the RF chip to the conformal RF antenna via the electrical coupling using the antenna of the coupling structure.

15. The system of claim 14, wherein the non-metallic component is a window of the vehicle and comprises a first glass layer and a second glass layer, wherein the conformal RF antenna is arranged between the first glass layer and the second glass layer of the window.

16. The RF device of claim 7, further comprising:
a ball grid array laminate arranged between the RF chip and the conformal RF antenna, wherein the RF chip is mounted on the ball grid array laminate,
wherein the coupling structure is mounted to the ball grid array laminate such that the coupling structure is arranged between the ball grid array laminate and the conformal RF antenna, wherein the ball grid array laminate is configured to receive the RF signal from the RF chip and couple the RF signal into the coupling structure.

17. The RF device of claim 7, wherein the RF signal is non-galvanically or wirelessly coupled into the at least one radiating element of the antenna layer via the coupling structure.

18. The RF device of claim 7, wherein the coupling structure is configured to transmit the RF signal, non-galvanically or wirelessly, through the opening and through the flexible dielectric substrate to the antenna layer.

19. The RF device of claim 7, further comprising:
a cavity that extends through the ground layer, the flexible dielectric substrate, and the antenna layer, wherein the cavity is configured to provide a thermal path for dissipating thermal energy generated by the RF chip in the stacking direction, wherein the cavity is configured to receive the thermal energy from the RF chip and transfer the thermal energy away from the RF chip.

20. The RF device of claim 7, wherein the antenna of the coupling structure is a patch antenna.

21. The RF device of claim 7, wherein the coupling structure is a first coupling structure and the RF device further comprises:
a second coupling structure mounted between the RF chip and the conformal RF antenna at the opening, wherein the first and the second coupling structures are displaced from each other, in the stacking direction, in alignment with the opening and are non-galvanically or wirelessly coupled to each other,
wherein the second coupling structure is configured to receive the RF signal from the first coupling structure and transmit the RF signal, non-galvanically or wirelessly, towards the antenna layer.

22. The RF device of claim 21, wherein the RF signal is non-galvanically or wirelessly coupled into the at least one radiating element of the antenna layer via the second coupling structure.

23. The RF device of claim 21, wherein the second coupling structure is mounted on the flexible dielectric substrate and is configured to receive the RF signal from the first coupling structure and transmit the RF signal, non-galvanically or wirelessly, through the flexible dielectric substrate towards the antenna layer.

24. The method of claim 9, further comprising:
forming the opening in the ground layer; and
providing a first coupling structure mounted between the RF chip and the conformal RF antenna at the opening, wherein the first coupling structure is configured to receive an RF signal from the RF chip and transmit the RF signal, non-galvanically or wirelessly, through the opening towards the antenna layer.

25. The method of claim 9, wherein the flexible dielectric substrate has a third surface defined by a third area that is provided in a third plane and a fourth surface defined by a fourth area that is provided in a fourth plane that is substantially parallel to the first plane and the third plane, wherein the fourth surface is arranged opposite to the third surface across a second thickness dimension of the flexible dielectric substrate, and wherein the third surface is in contact with the second surface at a first interface, and
wherein the antenna layer has a fifth surface defined by a fifth area that is provided in a fifth plane and a sixth surface defined by a sixth area that is provided in a sixth plane that is substantially parallel to the first plane and the fifth plane, wherein the sixth surface is arranged opposite to the fifth surface across a third thickness dimension of the antenna layer, and wherein the fifth surface is in contact with the fourth surface at a second interface.

26. The RF device of claim 1, wherein the ground layer has a first surface defined by a first area that is provided in a first plane and a second surface defined by a second area that is provided in a second plane that is substantially parallel to the first plane,
wherein the second surface is arranged opposite to the first surface across a thickness dimension of the ground layer, and
wherein the opening extends in the stacking direction through the thickness dimension.

27. The system of claim 14, wherein the ground layer has a first surface defined by a first area that is provided in a first plane and a second surface defined by a second area that is provided in a second plane that is substantially parallel to the first plane,
wherein the second surface is arranged opposite to the first surface across a thickness dimension of the ground layer, and
wherein the opening extends in the stacking direction through the thickness dimension.

* * * * *